United States Patent Office 3,261,797
Patented July 19, 1966

3,261,797
PROCESS FOR IMINATING POLYMERIC LATICES
Maurice J. McDowell, Media, and Ervin R. Werner, Jr., Levittown, Pa., assignors to E. I. du Pont de Nemours and Company, Wilmington, Del., a corporation of Delaware
No Drawing. Filed Oct. 28, 1964, Ser. No. 407,215
11 Claims. (Cl. 260—29.6)

This invention relates to a process for forming a novel aminoester polymer latex which is useful as an adhesive and in coating compositions, especially pigmented coating compositions. In particular, this invention relates to an economical and efficient process for forming an aminoester polymer latex which has improved wet adhesion to substrates and is stable under conditions of freezing and thawing.

The term "latex" designates an aqueous dispersion of a water-insoluble polymer which is present in the form of very fine particles.

The process of this invention is particularly concerned with efficiently reacting a "carboxylic polymer" with an aziridine compound to form aminoester polymeric latices which are useful as adhesives and as film formers in coating compositions, such as outdoor and indoor paints.

"Carboxylic polymer" designates a substantially water-insoluble interpolymer containing pendant carboxyl groups (—COOH) or their salts (e.g., —COONH$_4$). This interpolymer is the product of at least one monomer containing both polymerizable olefinic unsaturation and a carboxylic acid group (or equivalent source of carboxyl groups) with at least one other monomer which is co-polymerizable therewith.

In forming these aminoester polymeric latices, the aforementioned carboxylic polymer is reacted with an aziridine compound. The aziridine compound is often referred to as an alkylene imine and is a compound of the following formula:

FORMULA A

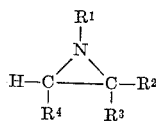

In Formula A, $R^1$ is H, benzyl, or a $C_1$ to $C_5$ alkyl radical, $R^2$ and $R^3$ are selected individually from the group consisting of H, benzyl, aryl and $C_1$ to $C_5$ alkyl radicals. $R^4$ is H or a $C_1$ to $C_5$ alkyl radical. $R^1$ should be H or a $C_1$ to $C_4$ alkyl radical when maximum dry film adhesion is desired.

The aforementioned reaction between the aziridine compound and the carboxylic polymer is herein referred to as an "imination reaction." The carboxylic polymer latex after it has been subjected to an imination reaction is referred to as an "iminated latex" or an "aminoester polymer latex."

Simms application, Serial Number 379,718, filed July 1, 1964, discloses a novel "aminoester polymer latex" prepared from a carboxylic polymer and an aziridine compound but the Simms procedure is inefficient and wasteful of the imine reactant. The process of the present invention is much more efficient in the use of alkylene imine and additionally produces a latex having better adhesion to substrates and substantially more freeze-thaw stability than aminoester polymer latices formulated by prior art processes.

The process of the invention is economical since less than the theoretical amount of alkylene imine necessary to esterify all the carboxyl is always used. Furthermore, this invention contemplates the addition of undiluted alkylene imine to a carboxylic polymer latex while it is at an elevated temperature where prior art processes required the carboxylic polymer latex to be cooled before an aqueous solution of alkylene imine was added. Surprisingly, in this invention, no polymer coagulation occurs in the latex nor does rapid hydrolysis of the imine take place as would be expected when the latex is at an elevated temperature but rather the imination reaction takes place rapidly and efficiently.

In the process of this invention, a latex of a carboxylic polymer is reacted with an alkylene imine to form a latex of a vinyl addition polymer which has attached to the carbon atoms of the polymer backbone monovalent radicals of the following formulas:

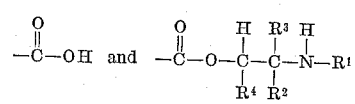

wherein $R^1$, $R^2$, $R^3$ and $R^4$ are as defined in Formula A.

An important feature of the process of this invention is to react at a temperature of about 35–90° C. (1) a carboxylic polymer that has 0.5–10% by weight monomer units and contains pendant carboxyl groups (—COOH) with (2) 10–70% of the molar amount of an alkylene imine necessary to convert the pendant carboxyl groups of the aforementioned carboxylic polymer to aminoester groups assuming 100% conversion of alkylene imine to aminoester. The alkylene imine used in the process of this invention is described in the aforementioned Formula A. Preferably, a reaction temperature of about 45–80° C. is used.

The alkylene imine is utilized most efficiently by adding undiluted imine to the carboxylic polymer latex which is at the aforementioned elevated temperature. This method allows for imination of the carboxylic polymer latex immediately after it is formed without first cooling to about 18–25° C. to add a water-diluted imine which heretofore was the practice.

The amount of alkylene imine used in this process to convert the pendant carboxyl groups (—COOH) of the polymer to aminoester groups is about 10–70% of the molar amount of alkylene imine necessary to convert all the pendant —COOH groups. Preferably, however, the amount of alkylene imine used is the molar amount which would convert 20–50% of the pendant —COOH groups on the carboxylic polymer. The above molar amounts of alkylene imine are on the basis that all the alkylene imine reacts with the pendant —COOH groups to form aminoester groups. Since the acid content of the carboxylic polymer is known, the actual weight of alkylene imine used in the process of this invention can be readily calculated by procedures well known in the art.

Particularly preferred alkylene imines are ethylenimine (Formula B) and 1,2-propylenimine (Formula C) because of their relatively low cost and plentiful supply and because they tend to give the best adhesion characteristics in most final products.

FORMULA B

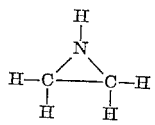

FORMULA C

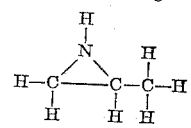

When the alkylene imine is added to the carboxylic polymer latex, some hydrolysis of the imine occurs; therefore, the iminated latex also contains the hydrolysis products of the imine. Furthermore, it is recognized that the aminoester radicals attached to the polymer backbone ionize and form positively charged ions which readily interact with the pendant anionic carboxyl groups of the polymer to form an ion having both a positive and a negative charge. However, for purposes of this invention, the polymer is defined as above.

The carboxylic polymer latex is prepared by known methods of emulsion polymerization in which a carboxylic acid monomer is reacted in an aqueous medium with a copolymerizable monomer that is not a carboxylic acid, for example, an alkyl ester of acrylic or methacrylic acid in which the alkyl group contains 1 to 12 carbon atoms, a conjugated diene having 4–10 carbon atoms, acrylonitrile, styrene, alkyl-substituted styrene, vinyl chloride, vinyl acetate, or a blend of two or more such monomers.

Preferably, methacrylic acid, acrylic acid, crotonic acid or itaconic acid, or mixtures thereof, are used as the monomer containing a carboxylic group for preparing the carboxylic polymer. Also useful are other olefinically-unsaturated carboxylic acids possessing one or more olefinic carbon-to-carbon double bonds and one or more carboxyl groups. Preferably, the carboxylic acid should contain at least one activated olefinic carbon-to-carbon double bond of a type which readily functions in an addition polymerization. That is, it should contain either (1) a double bond in the alpha-beta position with respect to a carboxyl group (—CH=CH—COOH), or (2) a double bond attached to a terminal methylene grouping (CH$_2$=C<).

The following acid monomers exemplify members of the number (1) group: crotonic acid, angelic acid, hydrosorbic acid, cinnamic acid, m-chlorocinnamic acid, p-chlorocinnamic acid, alpha-cyanocinnamic acid, ubellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta-(2-butenyl) acrylic acid, 2,4-heptadienoic acid 2,4-pentadienoic acid, 2,4,6-octatrienoic acid, 1-carboxyl-1-ethyl-4-phenyl butadiene-1,3 2,6-di-methyl decatriene - (2,6,8) - oic - 10, alpha-beta-isopropylidene propionic acid, alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid, and other monoolefinic polycarboxylic acids; 3-carboxy-pentadiene-(2,4)-oic-1, muconic acid, and other polyolefinic polycarboxylic acids.

The following acid monomers exemplify members of the number (2) group: acrylic acid, alpha-chloro acrylic acid, methacrylic acid, ethacrylic acid, alpha-isopropylidene acrylic acid, alpha-styryl acrylic acid (2-carboxyl-4-phenyl butadiene-1,3), beta-vinyl acrylic acid (1-carboxy butadiene-1,3), alpha-vinyl acrylic acid, beta-acryloxy propionic acid, itaconic acid, and others.

The carboxyl groups can also be introduced into the essential interpolymer from a carboxyl-supplying reagent such as maleic anhydride or monosodium oxalate by the method disclosed in U.S. Patent 2,662,874 (e.g., in column 3, line 34 and column 4, line 8), or from a reagent containing groups hydrolyzable to carboxyl groups by the method disclosed in U.S. Patent 2,710,292.

Typical of the known methods of making a carboxylic polymer latex useful in the practice of this invention are those described in U.S. Patents 2,395,017; 2,724,707; 2,-787,603; 2,868,752; 2,868,754; 2,918,391 and 3,032,521; the disclosures of which are incorporated herein by reference. Especially pertinent is the method described in U.S. 2,724,707, column 5, line 21 to column 6, line 60.

The emulsion used in preparing the carboxylic polymer latex is composed of the mixture of monomers, suitable emulsification and suspension agents (surfactants) buffering agents for pH control and a free radical catalyst; for example, potassium persulfate, a peroxide such as hydrogen peroxide, a diazo compound such as azobisisobutyroamidine hydrochloride or a redox type such as persulfate-sulfite, or mixtures of such catalysts. Polymerization can be carried out in the presence of a free radical catalyst in a closed vessel in an inert atmosphere and under autogenous pressure or under artificially induced pressure or in an open vessel under reflux at atmospheric pressure. The temperatures of the polymerization can be varied from 0° C. or lower to 100° C. or higher, preferably from 20° C. to 90° C., depending to a large degree upon the activity of the monomers and catalyst used and the molecular weight desired in the polymeric product.

The carboxylic polymer is produced in any molecular weight that is desired; usually the molecular weight is above 50,000 and frequently above about a million.

The carboxylic acid monomer is preferably added to the emulsion reaction mixture in an amount sufficient to result in a carboxylic polymer into which about 0.01 to 2% but preferably 0.1 to 1.5% amino nitrogen (by weight of polymer) can be introduced during the subsequent imination reaction. Generally, the carboxylic polymer should have an acid milliequivalent of about 0.001 to 3.0, preferably 0.05 to 2.3, and even more preferably about 0.1 to 1.0 milliequivalents per gram of polymer (dry basis). In the interest of obtaining a substantially water-isoluble carboxylic polymer and a stable latex product, it is usually best to add less than 10%, preferably less than 6%, acid monomer based on the total weight of monomer in the reaction mixture.

The acid content of the carboxylic polymer can be determined by separating the polymer from the aqueous phase, dissolving it in a solvent and titrating the resulting polymer solution with alcoholic KOH to a phenolphthalein end-point. The acid content can also be determined by complete chemical analysis of the polymer.

In a typical procedure for carrying out the imination reaction, the aziridine compound is mixed with the carboxylic polymer latex, containing about 0.5 to 10% based on the weight of the polymer of either an anionic or non-ionic surfactant or a mixture thereof at about 35–90° C. atmospheric pressure. The mixture is agitated under these conditions until the reaction is completed (e.g., about ½ hour at the higher temperature to about 12 hours at the lower temperature), and finally the reaction product is cooled to room temperature. The upper temperature limit is determined largely by how much heat the particular latex will withstand without coagulating.

It is essential that the polymeric latex of this invention contain either an anionic or a non-ionic surfactant, but preferably a mixture of an anionic and non-ionic surfactant containing a major portion of the non-ionic surfactant is used. The surfactant must be present in an amount of about 0.05–10% base on polymer solids. It is also essential that for use in coating compositions, the aqueous dispersions of this invention have a pH of at least about 7 and preferably about 8–10. This pH can be attained by addition of a suitable base to the imination reaction product mixture. Ammonia is convenient to use for this purpose but amines and alkaline materials, such as KOH and NaOH, can be used. Morpholine can be used to form a latex with good freeze-thaw stability. When the latex is to be used in a paint composition, a pH of 9–10 is preferred and is obtained by addition of a base, such as ammonia, to the iminated polymer latex.

Since the aziridines are known to be very susceptible to polymerization and hydrolysis, it is quite unexpected that these compounds can be reacted so effectively and efficiently with a carboxylic polymer latex, particularly since substantially less imine than the theoretical amount necessary to esterify all the pendant carboxyl groups is added. It was expected that these imines would polymerize and hydrolyze before any useful amount of aminoester units could be formed. Also, in view of the known sensitivity of latices, it is surprising that undiluted alkylene imine can be added while the latex is at an elevated temperature without coagulating the latex.

The novel process of this invention is simple, economical and substantially free of health and fire hazards.

Moreover, since many of the preferred carboxylic polymers are most effectively produced by emulsion polymerization, and since the imination reaction of this method is performed within the resulting latex, i.e., the alkylene imine is simply added to the latex, certain costly steps that would be necessary in a solvent-medium reaction are absent from this method (e.g., separation, drying and dissolving the carboxylic polymer).

The aminoester polymer latices obtained by the process of this invention are particularly useful in outdoor and indoor house paints, concrete paints, clear finishes for wood, bowling lane finishes, clear finishes for metals, such as aluminum and chrome. To form a pigmented coating composition, any of the ordinary water insoluble inorganic and organic paint pigments can be used with the above latices.

However, the relative amount and type of pigment in the latex binder has a significant effect on the properties of the paint. A pigment volume concentration of about 10% is about the minimum proportion of pigment which will provide a paint which has a practical hiding power. The maximum proportion of pigment volume concentration is about 50%. Preferably, however, a pigment volume concentration in the range of 25–40% is desirable. Pigment volume concentration is the ratio expressed on a percent basis of the volume of pigment to the total volume of pigment plus film forming materials of the compositions; the "volume of pigment" is the volume of vehicle displaced by the pigment wet with vehicle. All the pigments and extender pigments well known in the art can be used in formulating these paints.

Various auxiliary agents which are normally used in latex base paints can also be added, including bodying agents, such as methyl cellulose, defoaming agents, such as waxes, humectants, such as water soluble gums and bactericides or fungicides, such as borax.

Surprisingly, the aminoester polymer latices of this invention are even useful as finishes for poromeric materials, particularly poromeric materials formed with a microporous polyurethane which is reinforced with polyester. These iminated polymer latices are also useful as heat sealable coatings on polyolefin films and polyester films and as coatings on fibers, such as nylon and polyester fibers.

Furthermore, the aminoester polymer latices of this invention are useful as adhesives for a wide variety of materials, for example, vinyl film to fabrics, nylon to fabrics, vinyl to cotton, cellophane to paper, nylon film to paper and polypropylene film to paper. The adhesives formulated from the aminoester polymer latices of this invention have a superior bond strength to those adhesives formulated from the corresponding carboxylic polymer latices which are iminated with an amount of alkylene imine which is in excess of 70% of the molar amount necessary to esterify all the pendant carboxyl groups.

While any of the water-soluble anionic and non-ionic surfactants ordinarily used in aqueous emulsion polymerization techniques can be used in the aqueous dispersion of this invention, sodium lauryl sulfate is one preferred surfactant which provides polymer particles of optimum size. Soluble alkali metal and ammonium salts of half esters of sulfuric acids with long chain fatty alcohols can also be used, as can water soluble polyalkylene oxide derivatives. Other surfactants which can be used include alkyl aryl sulfonates, sulfated and sulfonated esters and ethers and alkyl sulfonates. Numerous additional species of anionic and non-ionic surfactants useful in this invention are listed in "Synthetic Detergents" by J. W. McCutcheon, published annually by MacNair-Dorland Company, New York.

The examples which follow are given for the purpose of illustrating the invention. All quantities shown are on a weight basis unless otherwise indicated. The water listed in the formulas is deionized water.

Example 1

An aminoester polymer latex is prepared by first forming a latex of a carboxylic polymer.

LATEX A

| | Parts by weight |
|---|---|
| Portion 1: | |
|   Water | 405.0 |
|   Anionic surfactant (30% aqueous solution of sodium lauryl sulfate) | 1.0 |
| Portion 2: | |
|   Water | 18.2 |
|   Potassium persulfate | 0.6 |
| Portion 3: | |
|   2-ethylhexyl acrylate | 191.2 |
|   Methyl methacrylate | 159.0 |
|   Methacrylic acid | 10.8 |
| Portion 4: | |
|   Water | 71.0 |
|   Anionic surfactant (30% aqueous solution of sodium lauryl sulfate) | 6.2 |
| Portion 5: | |
|   Water | 4.0 |
|   Potassium persulfate | 0.2 |
| | 867.2 |

Each portion is premixed before it is added. Portion 1 is charged into a conventional polymerization vessel equipped with stirrer, thermometer, condenser and means to introduce nitrogen and reagents. The following polymerization reaction is carried out under nitrogen. Portion 1 is heated to 70° C., Portion 2 is added with constant stirring, and while the contents of the vessel are kept at 70 to 80° C., Portions 3 and 4 are added gradually and simultaneously over a period of 2 hours. Then Portion 5 is added, and the temperature of the mixture is kept at 70 to 80° C. for another 2 hours. The resulting carboxylic polymer latex is cooled at 25° C. and is filtered through cheesecloth to remove any coarse coagulum that has formed. The latex is then immediately neutralized with ammonium hydroxide.

Carboxylic Polymer Latex A has a polymer solids content of about 42%. The polymer is a 53:44.3 interpolymer of 2-ethylhexyl acrylate:methyl methacrylate:methacrylic acid and has a molecular weight of over a million. Three portions of Carboxylic Polymer Latex A are iminated respectively with ⅓, ⅔ and ⅗ of the molar amount of imine required to esterify all the pendant carboxyl groups.

A reaction vessel equipped with a stirrer, a thermometer, a condenser and an addition funnel is charged with 100 parts of the Latex A. Three batches of Carboxylic Polymer Later A are iminated with about ⅓, ⅔ and ⅗ of the molar amount of propylenimine required to esterify all the pendant carboxyl groups of the polymer. In each batch, the latex is heated to about 50° C. and the charge of propylenimine is added gradually over a period of 10 minutes with stirring. The temperature of the mixture is maintained at 50° C. for an additional 30 minutes. The resulting aminoester polymer latex is slowly cooled to 25° C. and the pH is adjusted to 10.0 with morpholine; the latex is filtered through cheesecloth to remove any coarse coagulum that has formed.

In each instance, the three latices are analyzed for their —COOH content before and after the imination reaction and the efficiency of the imination reaction is calculated by dividing the moles of aminoester formed by the moles of alkylene imine used. The results as shown in Table I indicate that iminating with ⅓ of the molar amount of imine necessary to esterify all pendant carboxyl groups is the most efficient.

A comparison as a wood adhesive of each of the aminoester polymer latices and also of the non-iminated latex is made by first applying 0.5 mil thick layer of latex in a ½ inch wide strip across the width of a lightly sanded surface of a piece of a maple slat 0.25 inch thick, ½ inch wide and 6 inches in length. A similar piece of maple slat is then clamped in superposed contact with the latex coated surface under a pressure of about 5 p.s.i. and the assembly is heated in a 110° C. oven for one hour. After cooling the laminate at 25° C. and removing the clamps, the bond strength is measured in a conventional manner on an Instron Tensile Tester by pulling the pieces of wood apart at 180° angles at a rate of about 2 inches per minute.

An identical comparison is made as above of the aminoester polymer latices, except the adhesive bond between the maple slats is formed at about 25° C. over a two-day period. The results of these tests are shown in Table I.

In each instance, the iminated latices have a much greater bond strength than the uniminated latex. Also, a lower bond strength is noted for the latex that is iminated with ⅔ or 100% of the molar amount of imine required to esterify all the pendant carboxyl groups in comparison to the latices iminated with ⅓ and ⅔ of the molar amount of imine.

When the above iminated latices and the uniminated carboxylic latex are compared as adhesives for polyvinyl fluoride film, similar results occur, i.e., the adhesive bonds of the iminated latices are significantly higher than the uniminated latex and lower adhesion is noted for the latex which is reacted with ⅔ of the molar amount of imine compared to the latices which are reacted with ⅔ and ⅓ of the theoretical amount of imine required to esterify all the pendant carboxyl groups.

Each of the above iminated latices are also tested for freeze-thaw stability. About 100 parts of each of the iminated latices and the uniminated carboxylic polymeric latex are each placed in a small container and subjected to a freeze-thaw cycle of 16 hours at −18° C. and 16 hours at about 25–26° C. After each cycle, the latices are examined for polymer coagulation. The results of this test which are also shown in Table I indicate that the latex iminated with ⅓ the molar amount of imine is much more freeze-thaw stable than the other iminated or non-iminated latices.

Example 2—Continued

| Portion 7: | Parts by weight |
|---|---|
| Deionized water | 27.7 |
| Ammonium persulfate | 0.8 |
| Portion 8: | |
| Deionized water | 24.5 |
| 35% aqueous solution of hydrogen peroxide | 7.0 |
| Portion 9: Propylenimine | 10.2 |
| | 4065.0 |

Each portion is premixed before it is added. Portions 1, 2, 4, 5 and 10% of Portion 3 are charged into a conventional polymerization vessel equipped with stirrer, thermometer, condenser and means to introduce nitrogen and reagents. The following polymerization reaction is carried out under nitrogen. The contents of the polymerization vessel are heated to about 78°–80° C. with constant stirring. The remainder of Portion 3 is added gradually and simultaneously with Portions 6, 7 and 8 over a period of 162 minutes. Portion 6 is added after ½ of Portion 3 is added. Portion 7 is added when about 90% of Portion 3 is added. The remainder of Portion 3 is added and then Portion 8 is added. Portion 9 is added slowly with constant agitation while maintaining the temperature for an additional 30 minutes. The latex is cooled to 25° C. and neutralized with ammonium hydroxide. Latex B has a polymer solids content of 47% and is a 69/28.5/2.5 interpolymer of ethyl acrylate:methyl methacrylate:methacrylic acid and has a molecular weight of over a million. Analysis of the polymer acid content shows that about ¼ of the pendant acid groups are esterified.

Adhesion tests to wood and polyvinyl fluoride film, conducted according to the procedure of Example 1, showed that the adhesive bonds of the iminated latex are significantly higher than the uniminated material. Freeze-thaw stability tests indicated that the iminated latex is substantially more stable than the uniminated latex.

Example 3

The following carboxylic polymer latices are prepared

TABLE I

| Example 1 Latex A | Imine/COOH Ratio Used | Imine Efficiency | Adhesion to Maple, lbs./in.², Bonds Formed at— | | Type Base Used | Number Freeze-Thaw Cycles Passed |
|---|---|---|---|---|---|---|
| | | | 25° C. | 110° C. | | |
| 2-EHA/MMA/MMA, 53/44/3 | Uniminated | | 1,012 | 1,094 | Morpholine | 0 |
| | 1:3 | 75.6 | 1,268 | 1,506 | do | 5 |
| | 2:3 | 63.0 | 1,608 | 1,912 | do | 2 |
| | 3:3 | 47.3 | 1,504 | 1,900 | do | 1 |

Example 2

| Portion 1: | Parts by weight |
|---|---|
| Deionized water | 184.5 |
| Nonionic surfactant (nonlyphenoxy (ethyleneoxy) ethanol) | 91.0 |
| Portion 2: | |
| Deionized water | 1818.6 |
| Anionic surfactant (sodium lauryl sulfate) | 7.9 |
| Portion 3: | |
| Ethyl acrylate | 1254.4 |
| Methyl methacrylate | 518.1 |
| Methacrylic acid | 46.5 |
| Portion 4: | |
| Deionized water | 32.4 |
| Sodium metabisulfite | 2.6 |
| Portion 5: | |
| Deionized water | 20.4 |
| Ammonium persulfate | 3.1 |
| Portion 6: | |
| Deionized water | 14.5 |
| Ammonium persulfate | 0.8 | using constituents and a polymerization procedure similar to that used in Example 2 with the exception of the polymeric components:

| | Polymeric Component | Ratio |
|---|---|---|
| Latex C | n-Butyl acrylate:methyl methacrylate:methacrylic acid. | 58:39:3 |
| Latex D | Vinyl acetate:2-ethyl hexyl acrylate:methacrylic acid. | 73:24:3 |
| Latex E | Butadiene:methyl methacrylate:methacrylic acid. | 36:60:4 |

Latices C, D and E are each iminated with propylenimine by the procedure of Example 2. The resulting iminated polymers have a molecular weight over a million and the latices have a polymer solids content of about 42%.

An analysis of the acid content of the polymers before and after the imination reaction is made which indicated about ¼ of the acid groups are esterified. The imine efficiency in each instance is about 65%. For each of the latices adhesion tests to wood and polyvinyl fluoride film according to the procedure of Example 1 showed that the adhesion bonds of the iminated latices are significantly higher than the uniminated material. Freeze-thaw stability tests indicate that the iminated latices are substantially more stable than the uniminated material.

We claim:

1. In the process for forming an aqueous dispersion suitable for use as a coating composition and consisting essentially of a latex of a vinyl addition polymer having attached to the carbon atoms of the polymer backbone monovalent radicals of the formulas:

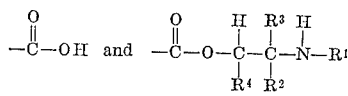

the improvement in combination therewith comprising reacting at a temperature of about 35 to 90° C. (1) a latex of a carboxylic polymer having 0.5–10% by weight monomer units containing pendant —COOH groups with (2) 10–70% of the molar amount of an alkylene imine necessary to convert the pendant —COOH groups of said carboxylic polymer to aminoester groups to form said vinyl addition polymer and (3) adjusting the pH of said latex with a water-soluble alkaline compound to about pH 8–10; said alkylene imine having the formula:

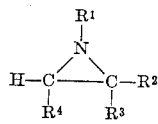

and wherein each of said formulas $R^1$ is from the group consisting of hydrogen, benzyl and $C_1$ to $C_5$ alkyl radicals, $R^2$ and $R^3$ are selected individually from the group consisting of hydrogen, benzyl, aryl and $C_1$ to $C_5$ alkyl radicals, and $R^4$ is from the group consisting of hydrogen and $C_1$ to $C_5$ alkyl radicals.

2. The process of claim 1 in which the alkylene imine is undiluted and is added to the carboxylic polymer latex when the latter is at a temperature of about 35 to 90° C.

3. The process of claim 1 in which the reaction temperature is about 45–80° C. and in which the amount of alkylene imine is the molar amount necessary to convert 20–50% of the pendant —COOH groups of said carboxylic polymer.

4. The process of claim 1 in which $R^1$, $R^2$, $R^3$ and $R^4$ are hydrogen.

5. The process of claim 1 in which $R^1$, $R^3$ and $R^4$ are hydrogen and $R^2$ is methyl.

6. A sheet material coated with the composition resulting from the process of claim 1.

7. A coating composition consisting essentially of the dispersion resulting from the process of claim 1 having a pH of about 9–10.

8. The coating composition of claim 7 containing coloring matter.

9. A wood substrate coated with the composition of claim 7.

10. A synthetic sheet material coated with the composition of claim 7.

11. In the process for forming an aqueous dispersion suitable for use as a coating composition and consisting essentially of a latex of a vinyl addition polymer having attached to the carbon atoms of the polymer backbone monovalent radicals of the formulas:

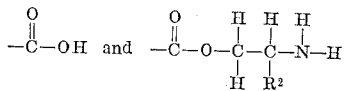

wherein $R^2$ is selected from the group consisting of hydrogen and methyl; the improvement in combination therewith comprising reacting at a temperature of about 45–80° C. (1) a carboxylic polymer having 2–6% by weight monomer units containing pendant —COOH groups with (2) the molar amount of an alkylene imine necessary to convert about 20–50% of the pendant —COOH groups of said carboxylic polymer to aminoester groups to form said vinyl addition polymer; wherein said alkylene imine is selected from the group consisting of ethylenimine and 1,2-propylenimine.

References Cited by the Examiner

UNITED STATES PATENTS

| 2,915,480 | 12/1959 | Reeves et al. | 260—79 |
| 2,918,391 | 12/1959 | Hornibrook | 260—29.6 |
| 3,113,038 | 12/1963 | Lattarulo et al. | 117—140 |

References Cited by the Applicant

UNITED STATES PATENTS

| 3,108,979 | 10/1963 | Le Fevre et al. | |

MURRAY TILLMAN, *Primary Examiner.*

W. J. BRIGGS, Sr., *Assistant Examiner.*

Disclaimer 3,261,797.—*Maurice J. McDowell*, Media, and *Ervin R. Werner, Jr.*, Levittown, Pa. PROCESS FOR IMINATING POLYMERIC LATICES. Patent dated July 19, 1966. Disclaimer filed Mar. 24, 1970, by the assignee, *E. I. du Pont de Nemours and Company*.

Hereby enters this disclaimer to claims 1, 2, 3, 5–9, and 11 of said patent.
[*Official Gazette July 7, 1970.*]